United States Patent [19]

Cannon et al.

[11] Patent Number: 5,754,954
[45] Date of Patent: May 19, 1998

[54] COMMUNICATION UNIT WITH OVER THE AIR PROGRAMMING

[75] Inventors: Gregory L. Cannon, Coconut Creek; Mohammad M. Ghomeshi, Ft. Lauderdale, both of Fla.

[73] Assignee: Motorola, Inc., Schaumburg, Ill.

[21] Appl. No.: 738,408

[22] Filed: Oct. 25, 1996

Related U.S. Application Data

[63] Continuation of Ser. No. 593,187, Jan. 29, 1996, abandoned, which is a continuation of Ser. No. 61,758, May 12, 1993, abandoned, which is a continuation of Ser. No. 680,659, Apr. 4, 1991, abandoned.

[51] Int. Cl.$^6$ ............................................. H04Q 7/20
[52] U.S. Cl. ............................ 455/419; 455/518; 455/70
[58] Field of Search .................... 435/33.1, 53.1, 435/54.1, 54.2, 56.1, 69, 70; 379/59, 60; 455/419, 518, 418

[56] References Cited

U.S. PATENT DOCUMENTS

| | | |
|---|---|---|
| 4,788,657 | 11/1988 | Douglas et al. ............... 379/90 X |
| 4,817,190 | 3/1989 | Comroe et al. ................. 455/56.1 |
| 4,839,628 | 6/1989 | Davis et al. .................. 340/825.5 |
| 4,935,732 | 6/1990 | Andros et al. ..................... 379/59 |
| 5,012,234 | 4/1991 | Dulaney et al. ............. 340/825.31 |
| 5,297,191 | 3/1994 | Gerszberg ......................... 379/59 |
| 5,297,192 | 3/1994 | Gerszberg ......................... 379/59 |

*Primary Examiner*—Edward F. Urban
*Attorney, Agent, or Firm*—M. Mansour Ghomeshi

[57] ABSTRACT

A communication unit (100) for operation in a communication system (600). The communication system (600) includes a plurality of communication units (100) and a control resource (300). The communication unit (100) includes a transmitter (118) for transmitting a signal to the control resource (300) requesting programming information using a bootstrap mode of operation. The communication unit (100) also includes a receiver (106) for receiving programming information sent by the control resource (300). The communication unit (100) further includes a controller (112) coupled to the transmitter (118) and the receiver (106) for programming the communication unit (100) using the received programming information prior to receiving authorization for using the communication unit.

16 Claims, 7 Drawing Sheets

COMMUNICATION UNIT WITH OVER THE AIR PROGRAMMING

This is a continuation of application Ser. No. 08/593,187, filed on Jan. 29, 1996 which is a continuation of Ser. No. 08/061,758 filed on May 12, 1993 and which is a continuation of Ser No. 07/680,659 filed Apr. 4, 1991, all of which are now abandoned.

TECHNICAL FIELD

This invention relates generally to communication devices and more specifically to communication devices operating in a communication system.

BACKGROUND

Radios operating in a communication system are generally programmed at the factory or at a service center in accordance with the requirements established by the user at the time of purchase. In trunking systems, the programming of radios includes assignment of frequencies, assignment of private line channels, and fleet definitions. In conventional systems, frequencies along with private line information are programmed into the radios. Mixed systems require radios to be programmed with all the fore-mentioned information. Currently, when a system is built, frequencies are allocated to trunking and conventional channels, and are set that way permanently. This is due to the fact that all the subscribers have a certain knowledge of the system that can not be changed without respective changes in the radios. Therefore, the system resources stay that way, even if the traffic on the trunking modes becomes very light and the conventional traffic becomes congested.

Additionally, radios operating in a communication system use code plugs, which are often Electronically Erasable Programmable Read Only Memory (EEPROM), to retain a portion of the system information. Generally these EEPROMs are programmed at the factory either plugged into the radio or outside the radio. Programming the code plug of a radio must be in concert with the requirements of the customer as set forth at the time of ordering the radio. These requirement may change as the radio is being built complicating the programming and opening more room to error. In some situations, the programming information is not available at the time the radio is ordered. In these situations the radio may be manufactured and stored for later programming. All these conditions add to the possibilities of error that are involved with local programming. As radio communications customers demand higher quality products, it is necessary for such products to be manufactured with the least amount of steps that would jeopardize product quality. It is therefore clear that a need exists for a radio that need not be programmed with customer operating information at the factory.

SUMMARY OF THE INVENTION

Briefly, according to the invention, a communication unit for operation in a communication system is disclosed. The communication system includes a plurality of communication units and a control resource. The communication unit includes transmitter means for transmitting a signal to the control resource requesting programming information using a bootstrap mode of operation. The communication unit also includes a receiver means for receiving programming information sent by the control resource. The communication unit further include controller means coupled to the transmitter means and the receiver means and adapted for programming the communication unit using the received programming information.

DETAILED DESCRIPTION OF THE PREFERRED EMBODIMENTS

Figure 6:
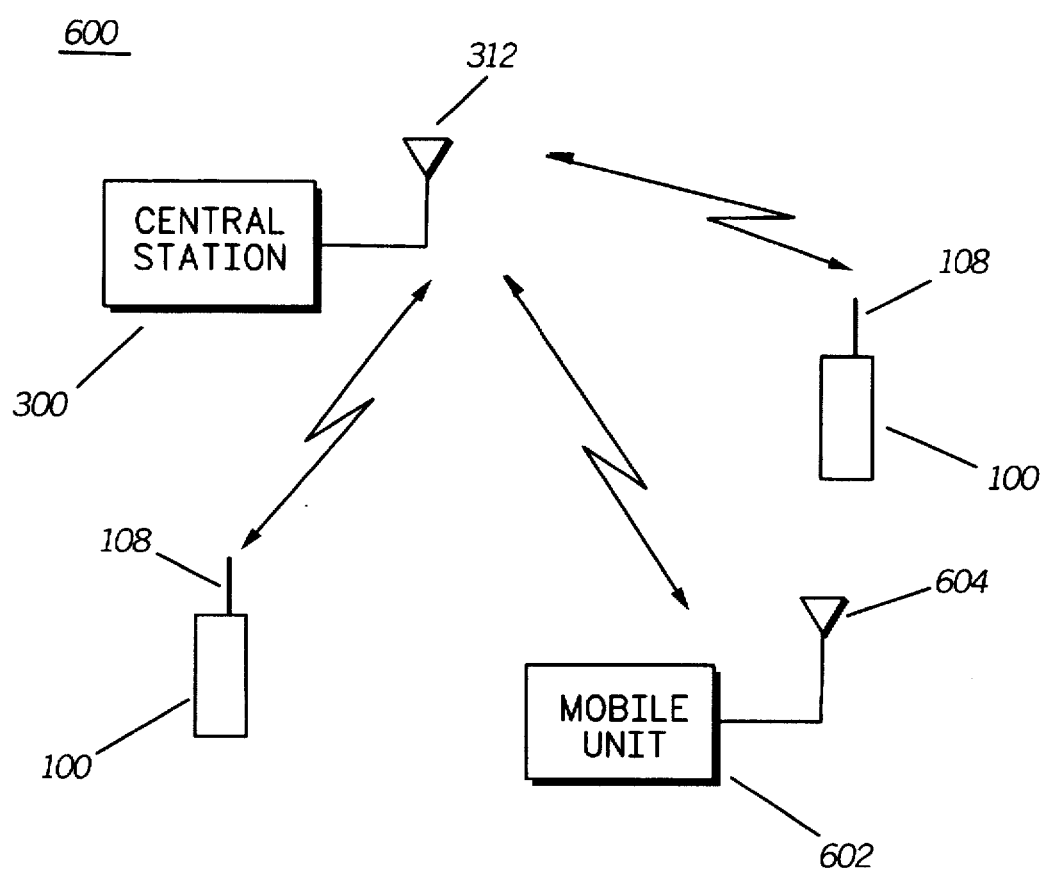
FIG. 6 is a communication system in accordance with the present invention.

Referring first to FIG. 6, a communication system 600 is shown in accordance with the present invention. The communication system 600 includes a central station 300 coupled to an antenna 312. The central station 300 constitutes the control resource of the present invention. The system 600 also includes a plurality of communication or subscriber units 100, each coupled to their individual antennas 108. Also included in the system 600 is a mobile unit 602 with its associated antenna 604. It is well known in the art that repeaters can be used in order to improve area coverage. These repeaters have not been shown in order to avoid unnecessary complication. For the purpose of this embodiment, it is assumed that the central station 300 includes repeaters. The communication unit 100 represents a number of portable units in the communication system 600. Hereinafter, the terms radio, device, communication unit, or subscriber unit will be commonly used to refer to the communication unit 100. The communication system 600 may be a trunked communication system in which case the software at the central station 300 includes portions to cover trunking operation. The operation of the mobile radio 602 and the radio 100 are generally the same as so far as the principles of the present invention apply. To avoid repetition, the operation of the radio 100 will be described in detail. It is understood that similar description applies to the operation of the mobile radio 602.

Figure 1:
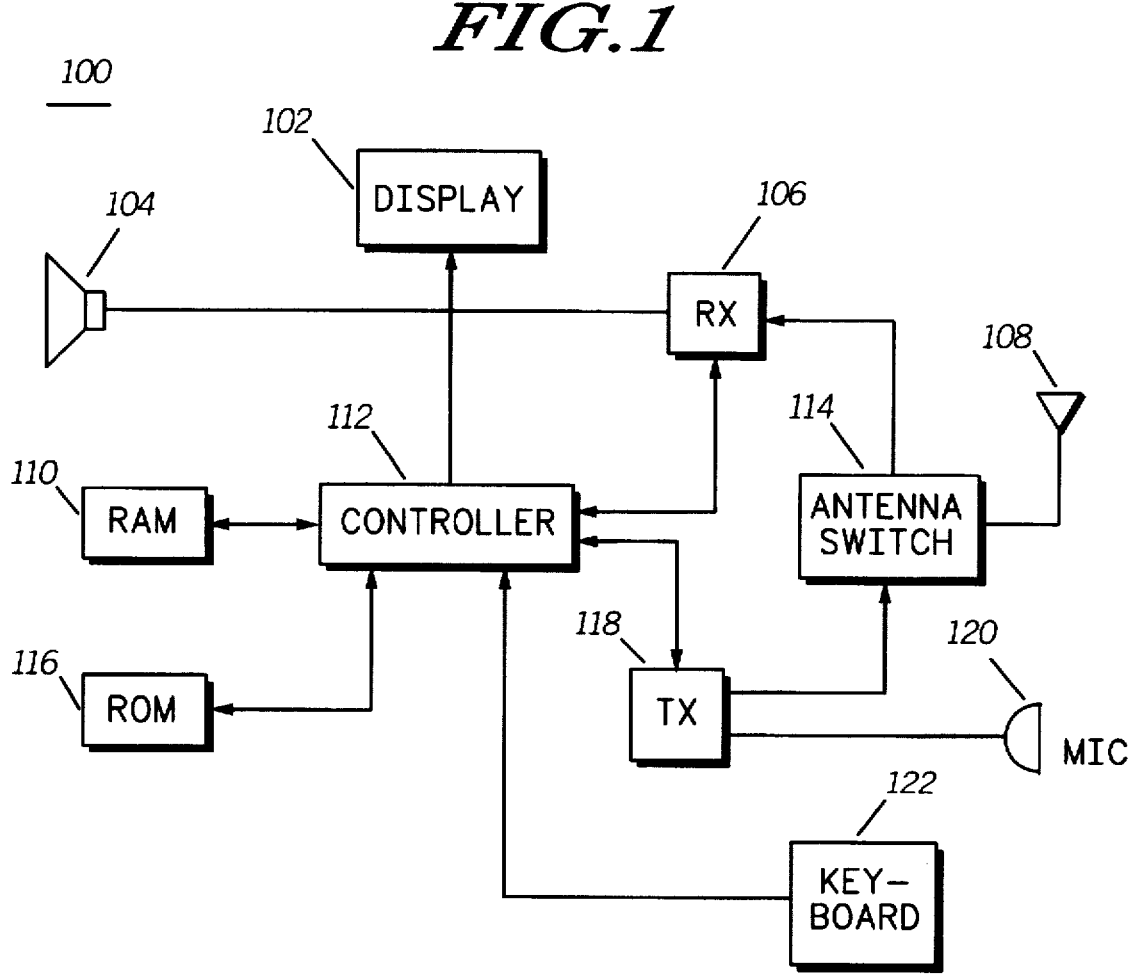
FIG. 1 is a block diagram of the element of a communication device in accordance with the present invention.

Referring to FIG. 1, a block diagram of a communication device 100 is shown in accordance with the present invention. A controller 112 is at the heart of the device 100 and is coupled to most of its elements. The controller 112 is preferably a micro-computer used in many communication devices. In the receive mode, the controller 112 directs an antenna switch 114 to couple an antenna 108 to the input of a receiver 106. A Radio Frequency (RF) signal available at the antenna 108 is received and demodulated by the receiver 106. The receiver 106 demodulates the received signal and communicates portions of it to the controller 112. The controller 112 determines the nature of the received signal and directs the receiver 106 to route it accordingly. Demodulated voice signals are applied to a speaker 104 that may include an amplifier. Demodulated data signals after having been decoded by the elements of the controller 112 are applied to a display 102 for presentation to a the user. As it will be demonstrated, some signals received by the receiver 106 are for internal use by the device 100. These received signals are programming information that were either solicited by the device 100 or are system initiated changes.

In the transmit mode, the controller 112 directs the antenna switch 114 to couple the antenna 108 to the output of the transmitter 118. Voice signals intended for transmission are coupled to the transmitter 118 via a microphone 120. Data signals are entered via a keyboard 122 which is coupled to the controller 112. These data signals are processed by the controller 112 and prepared for transmission by the transmitter 118. The operation of transmitters is well known in the art. The voice signals produced by the microphone 120 are used by the transmitter 118 to modulate a carrier signal appropriate for transmission via the antenna 108. Data signals produced by the controller 112 in response to the keyboard 122 are either simultaneously or separately used in the transmitter to modulate the carrier signal.

The device 100 includes two modes of operation; a bootstrap mode and a regular mode. In the bootstrap mode of operation, the radio 100 has limited communication ability with the central station 300. The controller 112, using the receiver 106 and the transmitter 118, communicates with the central station 300 in order to request and receive programming information on the radio 100. In the normal mode of operation, the received programming information is stored for later use by the radio 100, and the radio 100 communicates with the elements of the communication system 600 as desired.

The controller 112 is coupled to two memory blocks Random Access Memory (RAM) 110 and Read Only Memory (ROM) 116. The RAM 110 may be replaced with any erasable memory component such as an Electronically Erasable Programmable Read Only Memory (EEPROM). If desired, the controller 112 may include both the memory components as necessitated by design of the radio 100. The ROM 116 contains information, otherwise known as code, on the bootstrap mode of operation. In this embodiment, the ROM 116, and the portion of the controller 112 communicating and servicing the ROM 116, constitute the bootstrap means of the device 100. This mode of operation is invoked when the device 100 is reset or reprogramming request has been made by the user. In the bootstrap mode, the controller 112 fetches operating code from the ROM 116 and proceeds to execute them. As part of this code, the controller 112 sends an information request signal to the central station 300 via the transmitter 118. This signal requests a download of the operating and parametric information from the central station 300. The operating and parametric information includes frequency information, fleet information, private line information, talk around channel information, etc. The central station 300 receives this request and proceeds to send the appropriate operating information to the device 100.

The receiver 106 receives and demodulates the information sent by the central station 300. This information is preferably in the form of data signals. The demodulated data signals are routed to the controller 112 for further processing. The controller 112 decodes the information and stores what is necessary in the RAM 110. The information stored in the RAM 110 allows the radio 100 to operate in the normal mode of operation. At this point, the radio 100 is ready to operate as any other communication device would, having been programmed at a fixed site. If desired, RAM 110 may be replaced with other erasable memory components.

In its other functions, the controller 112 operates to alert the radio user of an incoming signal and proceeds to present the received message in a variety of ways depending upon the message type and optional features that may be enabled or disabled by the radio user. Thus, the controller 112 may send an alert signal to the speaker 104. After the alert, a voice message may be provided by the receiver 106 to the speaker 104. Data messages would follow the radio's address code to the controller 112. Such messages are subsequently analyzed by the controller 112 and, if appropriate, sent to the display 102 for presentation.

In summary, the radio 100 includes the controller 112 that sends a request for reprogramming to the central station 300 via the transmitter 118. This request is accomplished using a bootstrap routine that is stored in the ROM 116. The bootstrap routine could be common for all the radios that are manufactured, eliminating the need for radio personalization at the factory. The receiver 106 receives programming details back from the central station 300. This information is routed to the controller 112 where it is decoded and stored in the RAM 110. The information stored in the RAM 110 is the operating configuration of the radio 100 and is used by the radio 100 in sending or receiving communication signals. This procedure is followed whenever reprogramming is requested making it possible to program radios remotely and over the air.

Figure 2A:
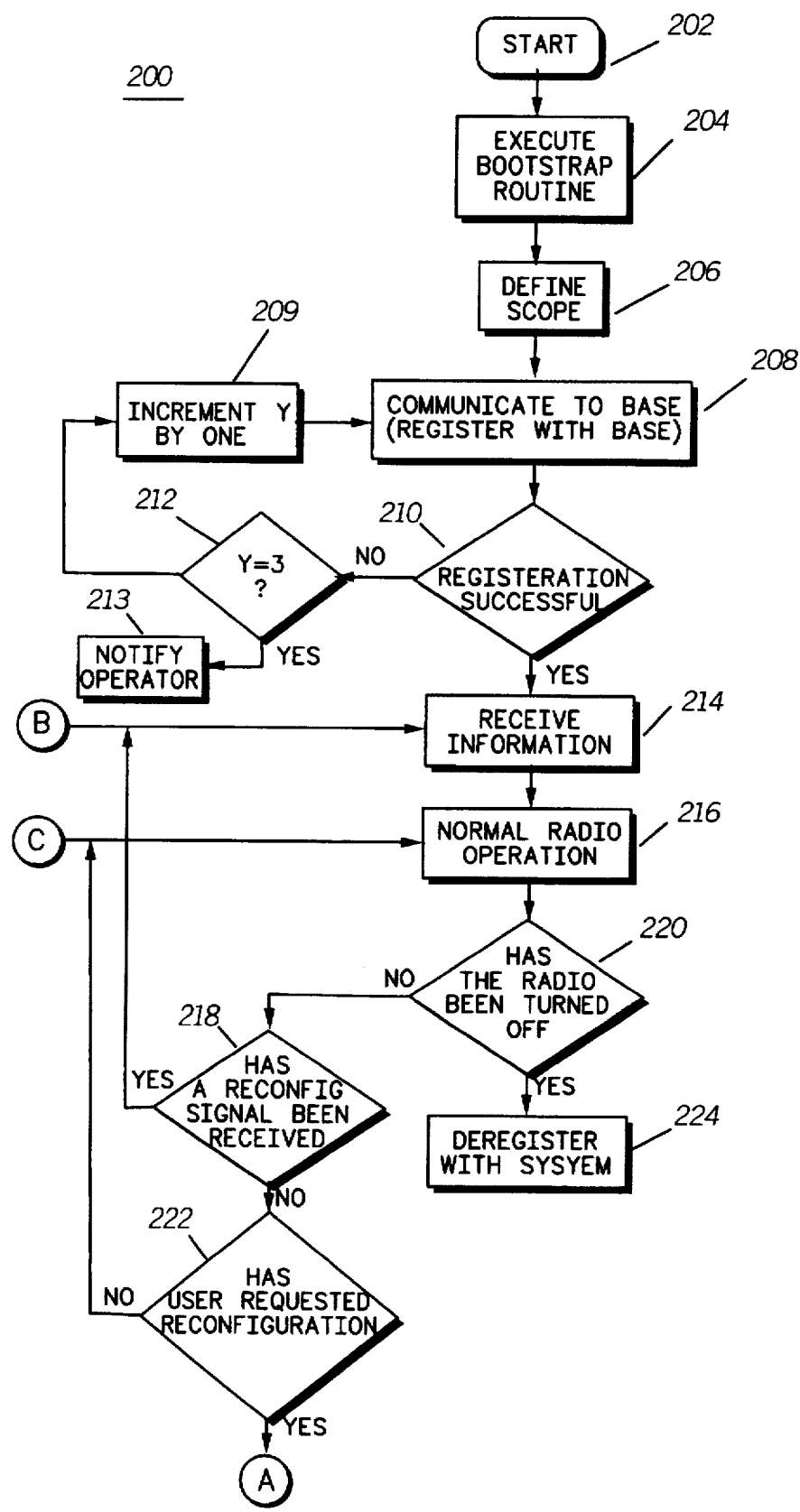
FIGS. 2A and 2B are charts of the operation of the communication device of FIG. 1 in accordance with the present invention.

Referring to FIG. 2, a flow chart 200 of the operation of the radio 100 is shown in accordance with the principles of the present invention. The flow chart 200 is controlled and executed by the controller 112. From a start block 202, the operation executes a bootstrap routine via block 204. The output of the execute bootstrap routine block 204 is coupled to a define scope block 206. At this block 206 the operator defines the scope of programming request. Various features (such as frequencies, fleet selection, or private line designation) can be requested by the operator at this time. The operator requests these features by entering a series of commands using the keyboard 122. Upon defining the scope of the operation, a communication link with the central station 300 is established via a communicate to base block 208. Under block 208 the transmitter 118 transmits a signal and registers with the central station 300.

The output of block 208 is coupled to a condition block 210 where a decision is made as to whether the registration was successful. The NO output of this decision block 210 is coupled to a condition block 212 where it is determined whether the current value in the counter Y is equal to integer 3. The counter Y is a software counter maintained by the controller 112 and is intended to keep track of the number of registration trials. The YES output of the decision block 212 indicates that three unsuccessful attempts have been made to register the radio 100 with the central station 300. This number of registration trials is considered more than adequate in a fully operational system. The YES output of block 212 is therefore coupled to a notify operator block 213. At block 213, the operator is notified of the unsuccessful registration attempts. The failure to successfully register with the central station 300 may be due to a radio or a system failure. In the later case and with some systems, the radio 100 may be equipped with an emergency routine included as part of the bootstrap mode of operation that would allow the operator to inform the central station 300 or the system manager of system failures. With this feature, the operator can communicate to the system manager the suspected system failure. The NO output of condition block 212 is connected to an increment counter Y by one block 209. At this block 209, the counter Y is incremented in order to keep track of the number of unsuccessful registration trials that have taken place. The output of block 209 is fed back into block 208 where another attempt is made to register with the central station 300. The loop created by blocks 208, 210, 212 and 209 continues until either a successful registration is made or the counter Y has registered three registration failures.

The YES output of block 210 automatically resets the Y counter and is subsequently coupled to a receive information block 214. At the block 214, the receiver 106 receives the programming information or otherwise the operating and parametric configuration from the central station 300 via the antenna 108 and the antenna switch 114. The output of block 214 is coupled to a normal radio operation block 216 where the radio 100 assumes normal operation. At block 216, the controller 112 decodes the programming information routed via the receiver 106, reconstructs the operating configuration of the radio 100, and stores the reconstructed operating configuration in the RAM 110. At this point, the radio is functioning as it would, had it been programmed at the factory. The normal radio operation block 216 continues to operate the radio 100 at the command of the operator. As part of the operation of the radio 100, a number of requests can be made by the operator. Those contributing to the understanding of this invention are included here and are shown as outputs of block 216.

Figure 2B:
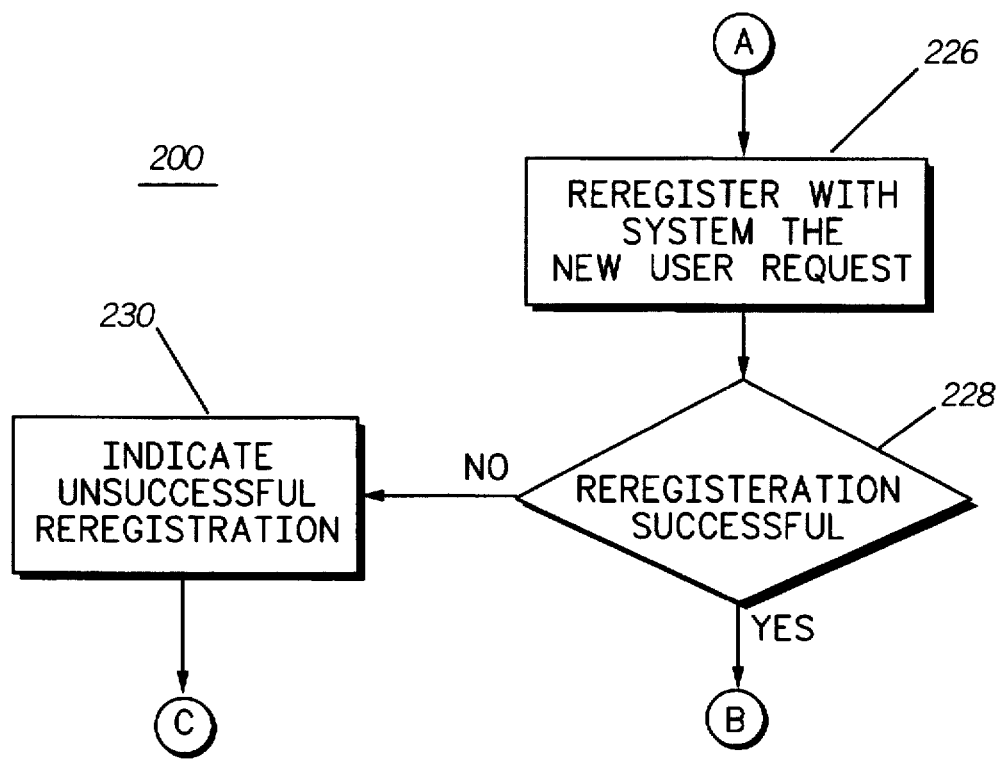

The output of normal radio operation block 216 is coupled to a condition block 220 where a decision is made as to whether the radio has been turned off. The YES output of block 220 is coupled to a deregister with system block 224. At block 224, the transmitter 118 sends a deregister information packet created by the controller 112 to the central station 300 via the antenna 108. This signal contains information to the extent that the radio 100 has gone off the air and no further communication should be directed to it. The NO output of the condition block 220 is coupled to another condition block 218 where a decision is made as to whether a re-configuration command signal has been received by the radio 100. In some situations it is necessary for the central station 300 to transmit a re-configuration command signal to a particular radio in the communication system 600. One particular example of such situation occurs when a frequency that is being used by the radio 100 is no longer operational, or part of the operating configuration that was programmed into the radio 100 earlier is no longer valid. Other situations may include fleet and/or Private Line changes. All these conditions warrant the reprogramming of the radio 100 by the central station 300. The YES output of the condition block 218 is routed back to receive information block 214 and the loop continues. The NO output of the condition block 218 is connected to yet another condition block 222. The decision made at block 222 is whether the user has requested a re-configuration. The NO output of the condition block 222 is connected back to the normal radio operation block 216. The loop created by the blocks 216, 218, and 222 continuous for so long as no re-configuration is either requested by the user or by the central station 300. The YES output of block 222 is connected to a re-register block 226, as shown in FIG. 2B. At block 226, the controller 118 proceeds to re-register the new user requests with the central station 300. As part of the operation of block 226, the new user requests are combined with the unchanged parameters available in the radio 100 to form a new configuration. A request for new configuration is then made to the central station 300 in the form of a re-registration. The output of block 226 is coupled to a condition block 228 where a decision is made as to whether the re-registration was successful. The YES output of condition block 228 is coupled back to the receive information block 214 of FIG. 2A via the interconnect B. The NO output of the condition block 228 is connected to an indicate unsuccessful re-registration block 230. The block 230 indicates to the user that the re-registration was not successful. Having the user been informed of the unsuccessful re-registration, the output of block 230 is coupled to the normal radio operation block 216 of FIG. 2A via the interconnect C.

To summarize, the flow chart 200 is used to demonstrate the operation of the radio 100 in accordance with the present invention. From the the start block 202 a bootstrap mode is entered whereby the user defines a set of parameters and requests a re-configuration of the operating system of the radio 100. The re-configuration request is communicated to the central station 300. This communication is repeated three times until a successful registration of the radio 100 by the central station 300 is acknowledged as demonstrated by the YES output of the condition block 210. At this point, the radio 100 receives the operating information and continues normal radio operation as indicated by blocks 214 and 216 respectively. Provisions have been made to cover situations when the radio has been shut down. In such situations, the operation communicates a signal to the central station 300 to deregister the radio 100. Further provisions have been made to accommodate the re-configuration requests originated from the central station 300 or the radio 100. In these situations, a loop is created to receive the information and resume normal radio operation.

Figure 3:
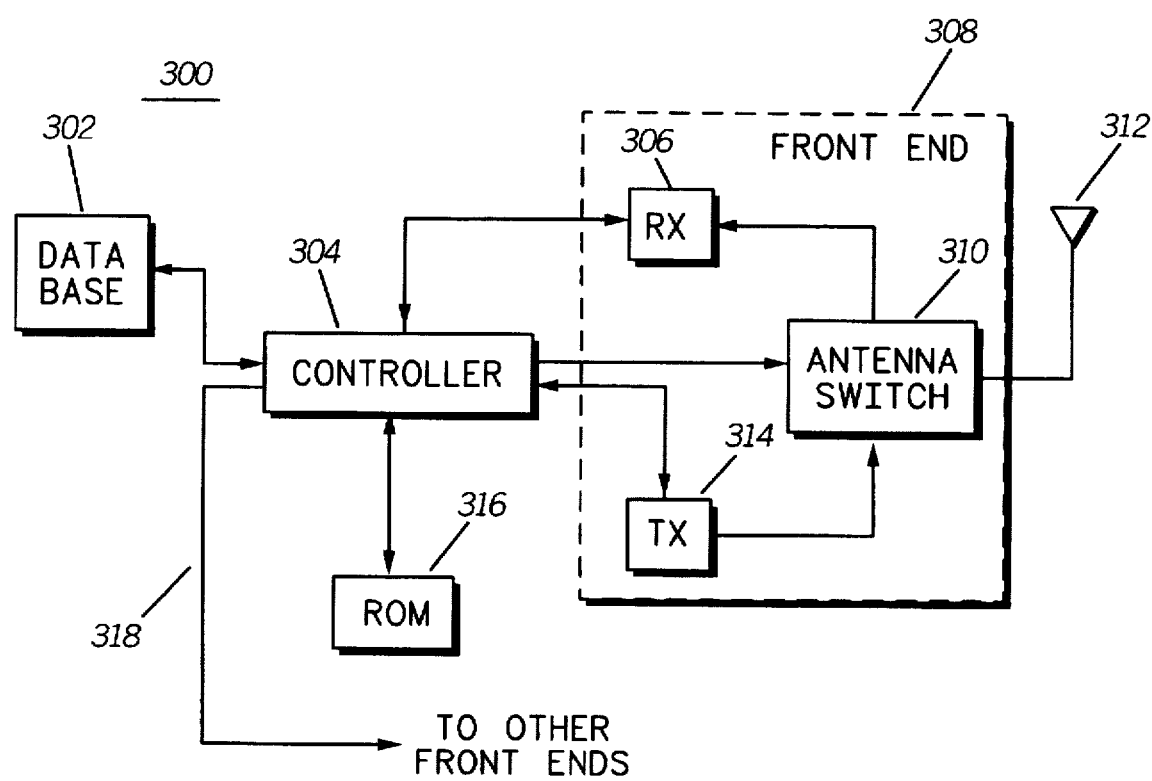
FIG. 3 is a block diagram of the elements of a central station in accordance with the principles of the present invention.

Referring now to FIG. 3, a block diagram of the internal elements of the central station 300 is shown in accordance with the principles of the present invention. The central station 300 includes a controller 304 that controls the operation of the various elements of the station 300. A receiver 306 and a transmitter 314 are connected to the controller 304 and process received signals and transmit signals respectively. An antenna switch 310 couples the transmitter 314 or the receiver 306 to an antenna 312 under the direction of the controller 304. A Read Only Memory (ROM) 316 and a data base block 302 are on the controller 304 bus. The earlier holds a firmware containing the operating system of the controller 304. The later contains configuration and parametric information on the radios operating in the communication system 600. The operation of the central station 300 is described as it communicates with the radio 100. It is understood that the central station 300 communicates with other elements of the communication system 600 in a similar fashion.

A radio frequency signal received at the antenna 312 is coupled to the receiver 306 by the antenna switch 310. The receiver 306 demodulates the received radio frequency signal and couples it to the controller 304. Controller 304 decodes the demodulated information and determines the request made by the received signal. In the event that the received signal is a registration or configuration request signal by the communication unit 100, the controller 304 proceeds to retrieve the information requested from the data base 302. This information is prepared for transmission in the controller 304 and submitted to the transmitter 314. The antenna switch 310 switches to the output of the transmitter 314 which proceeds to transmit the signal via the antenna 312. The receiver 306, the antenna 310, and the transmitter 314 are collectively shown to constitute the front end 308 of the central station 300. Several radio front ends that operate at different frequencies can be coupled to the controller 304 in parallel. These radio front ends are coupled to the controller 304 via a combined signal and control line 318. The use of several radio front ends accommodates several radios operating at different frequencies in the communication system 600. In systems where several repeaters are used, the controller 304 may be located at a central cite and be coupled to a number of front ends functioning as repeater. In effect, these additional front ends may represent repeaters that assist the radio 100 in communicating with the central station 300.

As mentioned, the information contained in the data base 302 is the radio programming information. Using this information, the central station 300 can remotely program the radio 100. The benefit of this remote programming is that the data base 302 is fully dynamic and located in a central location. Any changes to the operation of the radio 100 can be implemented at the data base 302. The latest configuration is always available at the central station 300 and ready to be solicited by the radio 100.

Figure 4:
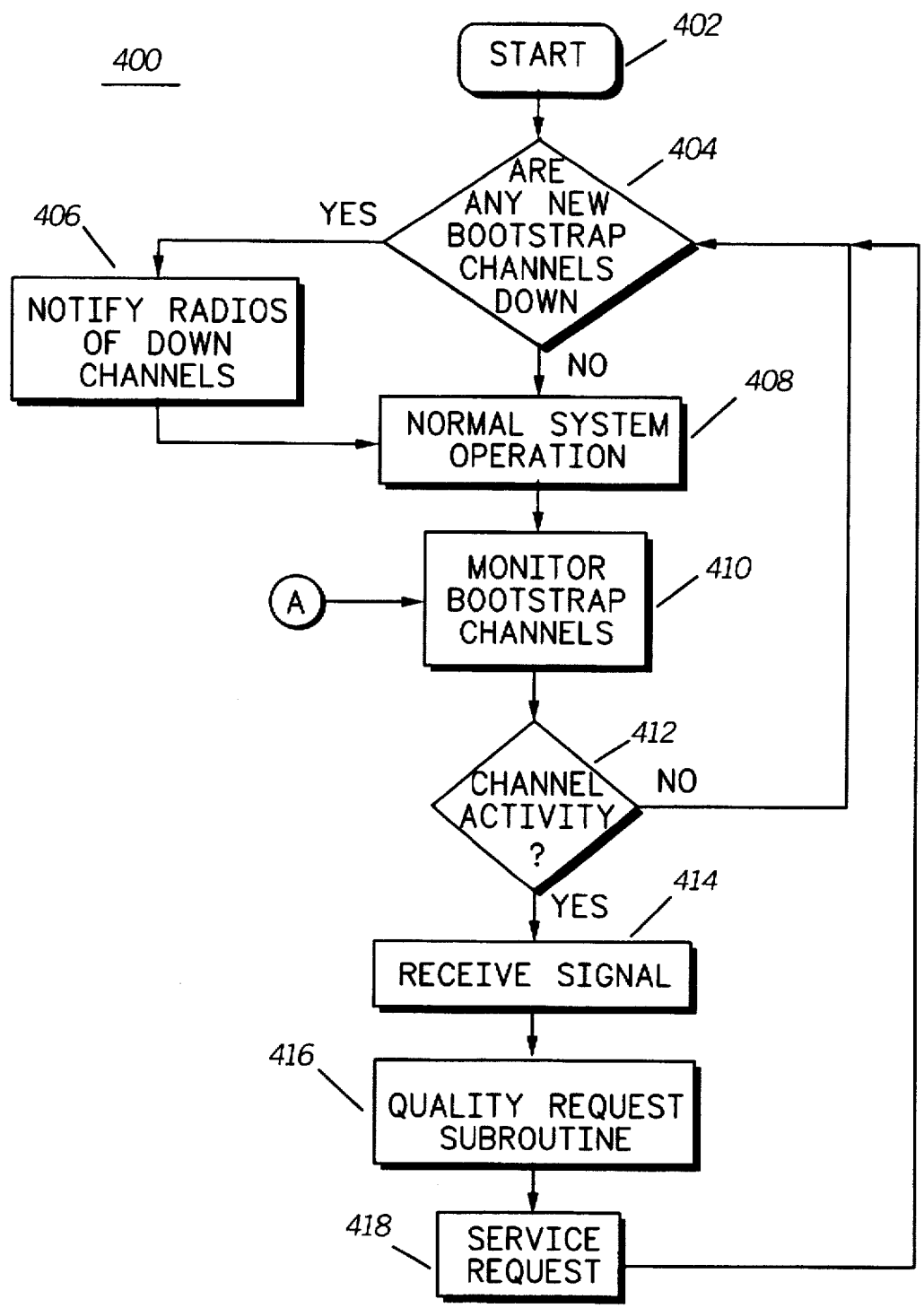
FIG. 4 is a flow chart of the operation of the central station of FIG. 3 in accordance with the present invention.

Referring now to FIG. 4, a flow chart 400 of the operation of the central station 400 is shown in accordance with the present invention. From a start block 402, the operation is coupled to a condition block 404, where a decision is made as to whether any new bootstrap channels are down. The receiver 306 monitors all the bootstrap channels for activity as part of the operation of block 404. The YES output of the condition block 404 is connected to a block 406 where radios operating in the system 600 are notified of all bootstrap channels that are down. Upon completing such notification, the operation is coupled to a normal system operation block 408. The NO output of the condition block 404 is also coupled to the normal system operation block 408. The output of block 408 is coupled to a monitor bootstrap channels block 410. The operation of the block 410 includes the receiver 306 monitoring the air waves for activity on the bootstrap channels. A condition block 412 coupled to the output of block 410 determines whether channel activity has been detected. The NO output of this decision block 412 is routed back to the condition block 404 where the loop continues for as long as no channel activity is detected on the bootstrap channels. The YES output of the condition block 412 is coupled to receive signal block 414 followed by a subroutine block 416. The block 416 is a qualify request sub-routine which is explained later in conjunction with FIG. 5. The output of block 416 is coupled to a service request block 418. At the block 418, the request received by receiver 306 is serviced by the controller 304 and the transmitter 314. This includes loading the controller 304 with programming and configuration information from the data base 302. The loaded information is then processed and coded for transmission by the transmitter 314. The output of the service request block 418 is routed back to the condition block 404 and the operation of the flow chart 400 is repeated.

Figure 5:
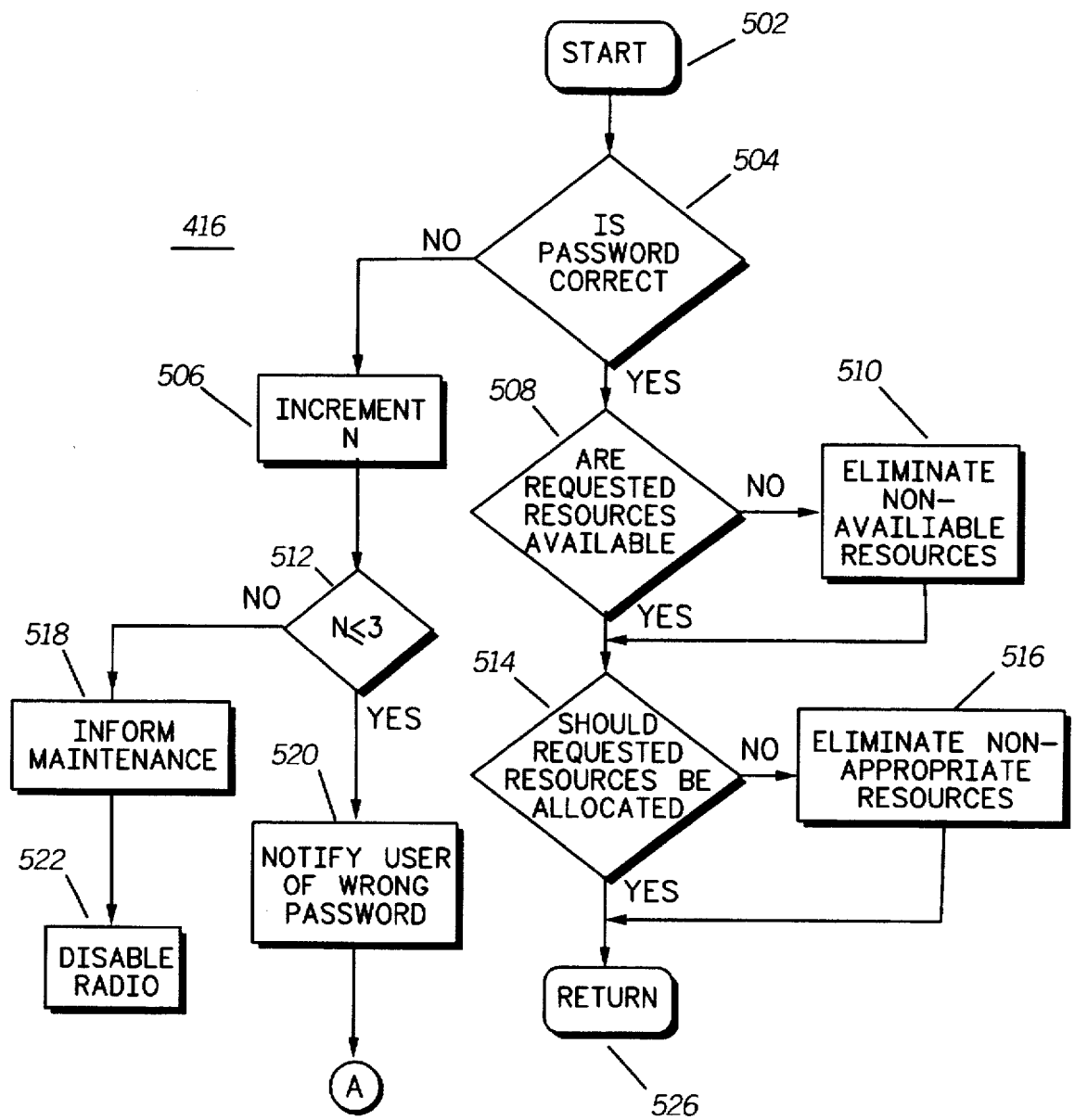
FIG. 5 is a subroutine flow chart of the flow chart of FIG. 4.

Referring to FIG. 5, a flow chart 416 of the operation of the qualify request sub-routine is shown. From a start block 502, the operation is coupled to a condition block 504 where the received password is evaluated. The block 504 compares the received password to those stored in the data base 302. The NO output of the condition block 504 indicates that the received password is invalid. This NO output is coupled to an increment counter N block 506. The counter N is used to count the number of received invalid passwords. The output of block 506 is coupled to a condition block 512 where the content of the counter N is evaluated. Block 512 questions whether the counter N is less than or equal to 3. The YES output of the condition block 512 automatically resets the N counter and is subsequently coupled to a notify user of wrong password block 520. With block 520, the central station 300 transmits a signal to the communication unit 100 and informs the user of having entered a wrong password. The output of block 520 is routed back to the monitor bootstrap channels block 410 in anticipation that the user will enter and transmit the correct password. The NO output of the condition block 512 indicates that the counter N has a value higher than 3. This condition is coupled to a block 518 where a maintenance group is informed that the a wrong password has been received from the radio 100 more than three times. The output of block 518 is coupled to a disable radio block 522. At block 522, the central station 300 proceeds to disable the radio 100 based on the assumption that the reception of three invalid passwords indicates that the radio 100 is being illegally used.

The YES output of the condition block 504 is coupled to another condition block 508 where a decision is made as to whether requested resources are available. The NO output of the condition block 508 indicating that some of the resources are not available is connected to a block 510 where the non-available resources of the received signal are eliminated from the received requested configuration list. The output of block 510 is coupled to a condition block 514. This block 514 is also connected to the YES output of the condition block 508. At the condition block 514, a decision is made as to whether the requested resources should be allocated to the radio 100. The NO output of the condition block 514 indicates that some of the requested resources cannot be allocated, not because of failure, but because of priority or security reasons. This is particularly useful in applications where various level of management with varying degree of authority are operating in the communication system 600. The NO output of block 514 is coupled to a block 516 where the non appropriate resources are eliminated from the requested configuration list. The output of block 516 is coupled to a return block 526. The YES output of the condition block 514 is also connected to the return block 526. The return block returns the subroutine operation to the service request block 418 of FIG. 4.

To summarize, the operation of the central station 300 is described using the flow chart 400. The flow chart 400 starts by informing the radio unit 100 of any down bootstrap channels. With this information available at the radio 100, reprogramming requests can be transmitted by the radio 100 and received by the central station 300 on other available bootstrap channels. The operation monitors the channel activities and receives available incoming signals. A received signal containing reprogramming requests is qualified by the sub-routine 416. The sub-routine 416 checks for valid passwords that are required in each reprogramming request made by the radio 100. A provision is made for situations where illegal use of the radio 100 is made. This is typically identified by the reception of false passwords for more than a specified number of trials. Other provisions are available to verify that the requested resources are available and that the requested radio 100 has the authority to request such programming information. Upon qualifying the request, the operations services the request and returns to monitoring airwaves for new programming requests.

Those skilled in the art will appreciate the use of other routines to achieve similar results. The presentation of the flow charts 200 and 400 are to present the preferred embodiment of the operation of the present invention. Several features may be added to the flow charts 200 and 400 to render a system more secure. It is understood from the flow charts 200 and 400 that they are basic flow charts needed for understanding the operation of the radio 100 and central station 300 respectively as it pertains to the essentials of the present invention.

A radio apparatus has been described that can be programmed remotely via a central station. With this invention remote programming of radios operating in a communication system is possible. Radios no longer have to be brought into a service shop for reprogramming. Radios operate minimally using an onboard bootstrap mode. As part of this mode, they request programming information from a central station which has the latest programming information for all the radios operating in the communication system. A reprogramming request received at the central station is serviced by retrieving information from a data bank resident at the central station. The retrieved information is coded and subsequently transmitted to the requesting radio using bootstrap channels. Remote programming of radios is significant in situations where a manufacturer has to upgrade the configuration of a large number of radios. The available route to this manufacturer is to recall these radios and have them reprogrammed at a service shop. The cost of gathering and reprogramming these radios is significantly high. But with no other choices available, there is no decision to be made. Radios must be programmed without much delay. The over the air programming facilitates this costly procedure and eliminates any costs that are associated with the fixed programming. With this invention, the reprogramming of radios will become a routine procedure. System operators do not have to sacrifice performance improvements that may be realized with minor reprogramming changes.

Other significant benefits of this invention may be observed in manufacturing plants. With present procedures, radios are programmed following a customer request sheet that has to follow the radio in its various phases. Mistakes are common and occur at various levels. This invention allows all radios to be programmed similarly at the factory regardless of customers or systems. Customer-specific configurations are later programmed into the radios remotely. It is no longer necessary to associate radios in the factory or service center with specific customers.

Those skilled in the art will recognize that various modifications and changes could be made with respect to the above described invention, without departing from the spirit and scope of the invention as set forth. Therefore, it should be understood that the claims are not to be considered as limited to the particular embodiments set forth in the absence of specific limitations expressly incorporating such embodiments.

We claim:

1. In a communication system, having a plurality of subscriber units and a control resource, at least one of the subscriber units comprising:

bootstrap means having a bootstrap mode for providing the subscriber unit with limited communication with the central controller and no communication with other subscriber units without any operating system program in order to request and receive an operating system program prior to requesting and receiving authorization for using the subscriber unit;

non-volatile storage means coupled to the bootstrap means for storing information on how to request operating program from the control resource;

transmitter means for initiating a programming request to the control resource, the transmitter coupled to the bootstrap means for transmitting the control resource a request for an operating program;

receiver means for receiving the operating program from the control resource; and controller means, coupled to the transmitter means and the receiver means, for installing the operating program in the subscriber unit in order to allow the subscriber unit to function beyond the bootstrap mode using the operating program acquired in the bootstrap mode such that the subscriber unit could communicate with other subscriber units.

2. The subscriber unit of claim 1, wherein the transmitter means includes the bootstrap means.

3. The subscriber unit of claim 1, wherein the controller means includes means for storing the received operating program.

4. The subscriber unit of claim 1, wherein the controller means includes a volatile memory in where the operating program is stored.

5. A method for dynamically and remotely programming the operating system of a communication unit, comprising the steps of:

transmitting a request-for-programming signal to a control resource using a bootstrap routine, the bootstrap routine providing the communication unit with the sole function of communicating with the control resource to request and receive an operating system program prior to requesting and receiving authorization for using the communication unit without the ability to communicate with other communication units;

receiving the operating system from the control resource via the bootstrap routine;

programming the communication unit using the received operating system;

transmitting a request-for-parameter signal to the control resource;

receiving parametric information from the control source; and entering a normal mode in response to the operating system received in the bootstrap mode;

communicating with other communication devices using the parametric information.

6. The method of claim 5, wherein the step of programming the subscriber unit includes storing the programming information in a volatile memory.

7. A radio communication device operating in a communication system having a control resource and a plurality of radios, comprising:

a bootstrap mode where the radio is incapable of communicating with other radios and can only communicate with the control resource of the communication system to request and receive an operating system program prior to requesting and receiving authorization for using the radio communication device, the bootstrap mode comprising;

a non-erasable memory component for storing a bootstrap routine;

a transmitter for transmitting a request signal to the control resource requesting the operating system;

a receiver for receiving the operating system;

a second memory component for storing the operating system;

a normal mode where the radio uses the operating system received in response to in the bootstrap mode in order to communicate with other radios; and a controller coupled to the bootstrap mode and the normal mode for providing communication between the radio and other radios otherwise not available in the bootstrap mode.

8. The radio of claim 7, wherein the controller comprises the bootstrap means.

9. The radio of claim 7, wherein the controller comprises a micro-controller.

10. The radio communication device of claim 7, wherein said radio communication device is a mobile radio.

11. The radio communication device of claim 7, wherein said radio communication device is a portable radio.

12. The radio communication device of claim 7, wherein the bootstrap mode comprises a routine stored in a non-erasable memory.

13. The radio communication device of claim 7, wherein the second memory component comprises an Electronically Erasable Programmable Read Only Memory (EEPROM).

14. The radio communication device of claim 7, wherein the second memory component comprises a Random Access Memory (RAM).

15. The radio communication device of claim 7, wherein the controller includes the second memory component.

16. The radio communication device of claim 7, wherein the controller includes the bootstrap mode.

* * * * *